No. 764,260.

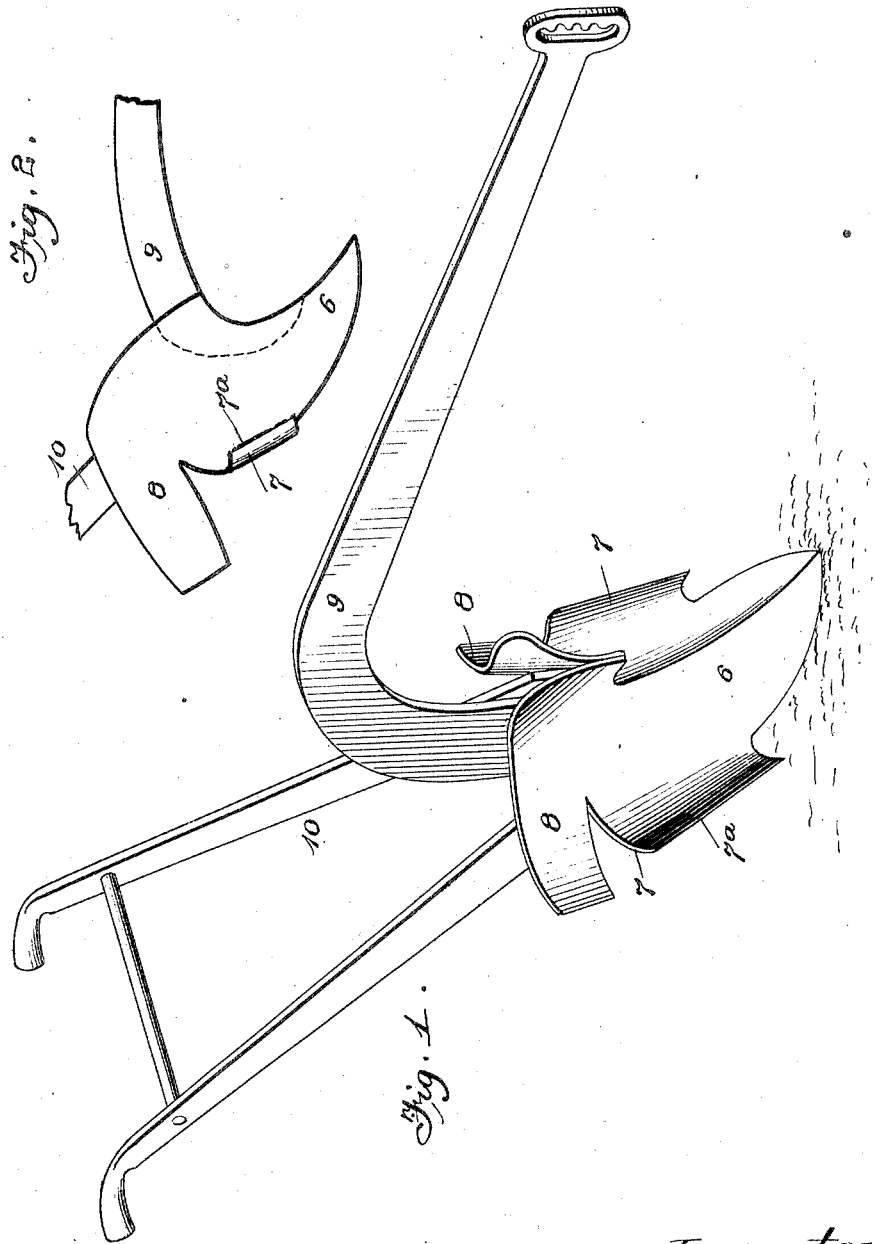

Patented July 5, 1904.

UNITED STATES PATENT OFFICE.

PATRICK SKELLY, OF COAL CITY, ILLINOIS.

DITCHING-PLOW.

SPECIFICATION forming part of Letters Patent No. 764,260, dated July 5, 1904.

Application filed May 5, 1904. Serial No. 206,593. (No model.)

*To all whom it may concern:*

Be it known that I, PATRICK SKELLY, a citizen of the United States, residing at Coal City, in the county of Grundy and State of Illinois, have invented new and useful Improvements in Ditching-Plows, of which the following is a specification.

This invention is a ditching-plow, and is characterized particularly by improvements with respect to the shape of point and moldboard whereby these parts act to cut the bottom and the sides of the ditch and lift the earth so that it is delivered by the moldboard to the side of the ditch.

The plow has a double point and moldboard, throwing the earth to both sides.

In the accompanying drawings, Figure 1 is a perspective view of the plow. Fig. 2 is a side elevation thereof.

Referring specifically to the drawings, the plow point or share is indicated at 6 of the shovel type, with the difference that the angle of the sides, where they join at the front or cutting edge, is quite obtuse, so that the sole of the plow is broad and the share cuts loose a broad slice below. At the rear edge on each side the share has a wing 7, which is flared out and curved forwardly to present a cutting edge at 7ª at the front, which edge serves to cut the side of the ditch. The earth cut by the share and said wings is lifted up and back to the moldboard 8, which extends outwardly and backwardly in a position to project beyond the edge of the ditch and of proper shape to deliver the earth to the sides of the ditch. The slice is cut by the share and its wings, and the soil is lifted up and thrown out by the moldboard to each side. The forwardly-presented cutting edges 7ª make unnecessary the use of colters to cut the sides of the ditch, and the outwardly-extending wings serve to assist the cutting and lifting action and to deliver the slice to the moldboards. The beam 9 enters between the moldboards and is preferably crooked around under the share to take the heavy strain thereon. The handles are shown at 10 inserted behind the moldboard.

What I claim as new, and desire to secure by Letters Patent, is—

A plow comprising a shovel-share having at its rear edges, on both sides, wings curved outwardly and forwardly, and moldboards above, extending rearwardly and laterally beyond the wings.

In testimony whereof I have signed my name to this specification in the presence of two subscribing witnesses.

PATRICK SKELLY.

Witnesses:
A. B. SCHALKLE,
ALEXANDER CLARK.